(12) United States Patent
Howell

(10) Patent No.: US 6,621,691 B2
(45) Date of Patent: Sep. 16, 2003

(54) PORTABLE COMPUTER WITH TOP MOUNTED OPTICAL DRIVE

(75) Inventor: Bryan Franklin Howell, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 09/901,827

(22) Filed: Jul. 10, 2001

(65) Prior Publication Data

US 2003/0011975 A1 Jan. 16, 2003

(51) Int. Cl.[7] .................................................. G06F 1/16
(52) U.S. Cl. ...................... 361/683; 361/681; D14/319; 312/223.2
(58) Field of Search ................................. 361/679–686; D14/315, 319, 337, 336, 442, 325; 312/223.1, 223.2; 369/2; 710/48; 349/58

(56) References Cited

U.S. PATENT DOCUMENTS

| | | | | |
|---|---|---|---|---|
| 5,355,357 A | | 10/1994 | Yamamori et al. | |
| D363,272 S | * | 10/1995 | Suzuki | D14/325 |
| 5,910,933 A | * | 6/1999 | Moore | 369/2 |
| 6,256,192 B1 | * | 7/2001 | Shannon | 361/683 |
| 6,279,056 B1 | * | 8/2001 | Jacobs et al. | 710/48 |
| 6,353,529 B1 | * | 3/2002 | Cies | 361/681 |
| 6,392,876 B1 | * | 5/2002 | Ramonowski | 361/683 |

* cited by examiner

Primary Examiner—Darren Schuberg
Assistant Examiner—Anthony Q. Edwards
(74) Attorney, Agent, or Firm—Haynes and Boone, L.L.P.

(57) ABSTRACT

A portable computer includes a base member and a lid member attached to the base member and movable between a closed position and an open position. A display is mounted on a first side of the lid member positioned adjacent the base member when the lid member is in the closed position. An optical drive is mounted on a second side of the lid member opposite the first side.

15 Claims, 4 Drawing Sheets

PORTABLE COMPUTER WITH TOP MOUNTED OPTICAL DRIVE

BACKGROUND

The disclosure herein relates generally to computer systems and more particularly to an optical drive device for a portable notebook computer.

Manufacturers of computer systems often have to provide several drives to satisfy the needs of their customers. Typically, the drives include a sheet metal housing which is slide mounted into a computer base by means of a rail system. Each chassis has unique size differences based on the components that they are built around. Electrically, the boards and performance of the devices are very similar, if not identical, and the defining differences in chassis size are generated by the number of drives.

The problem is how to get multiple drives into the same chassis size. Successful implementation of this idea would significantly reduce the amount of resources required to develop two completely unique chassis and focus efforts on one chassis that would satisfy the needs of consumers.

One solution which has been used is to provide add-on trays below the chassis to extend drive capacity. These have been used for notebook computers and also for compact disk (CD) players.

Therefore, what is needed is a drive that is mounted in a portable computer that is easy to access and is space efficient.

SUMMARY

One embodiment, accordingly, provides an optical drive mounted in a portable computer as an integrated component of the liquid crystal display (LCD) housing. To this end, a portable computer comprises a base member and a lid member attached to the base member so as to be movable between a closed position and an open position. A display is mounted in the lid member. An optical drive is mounted in the lid member and positioned to be accessible without moving the lid member to the open position.

A principal advantage of this embodiment is that the optical drive is easy to access, provides a weight reduction and has minimal space requirements. Also, an optical drive mounted in the display housing can supplement other drives mounted in the base member without requiring a conventional mounting in the base member.

DETAILED DESCRIPTION

Figure 1:
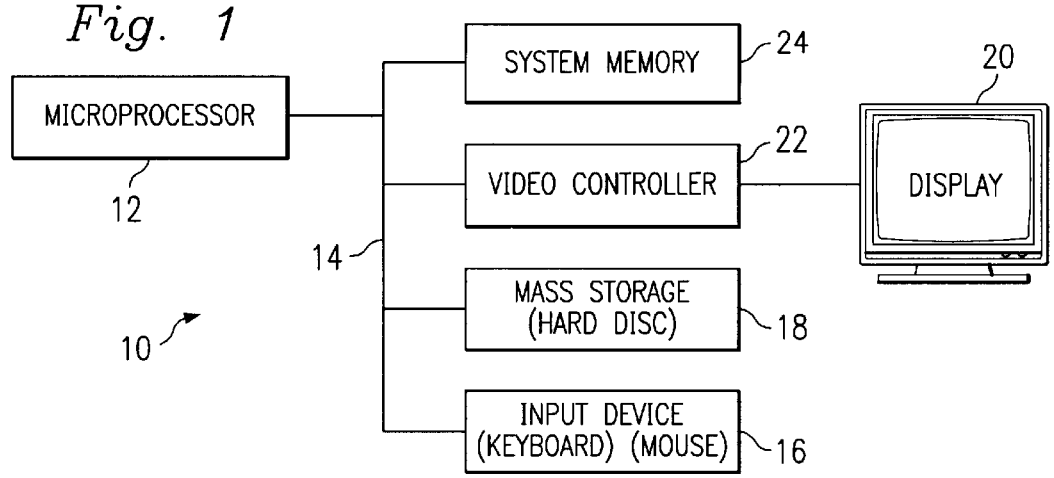
FIG. 1 is a diagrammatic view-illustrating an embodiment of a computer system.

In one embodiment, computer system 10, FIG. 1 includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
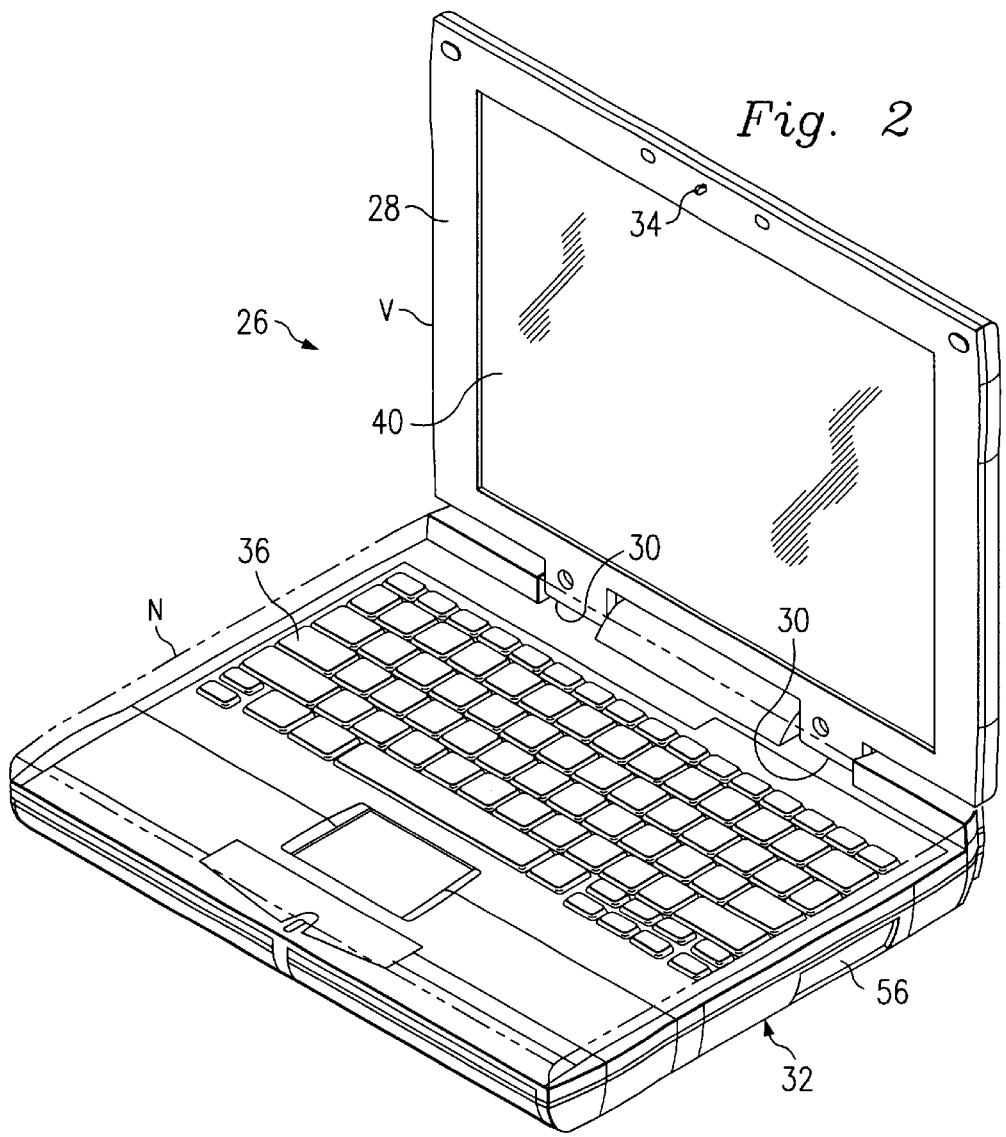
FIG. 2 is a perspective view illustrating an embodiment of a portable laptop computer.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position "N", with a horizontal base 32, to a substantially vertical or open position "V". Opening of the notebook style portable computer by manipulation of a latch 34, reveals a plurality of keys 36 on base 32, and a monitor screen 40 mounted in lid or top 28. The screen or display 40 is adjacent keys 36 when lid 28 is in the nested position N.

Figure 3:
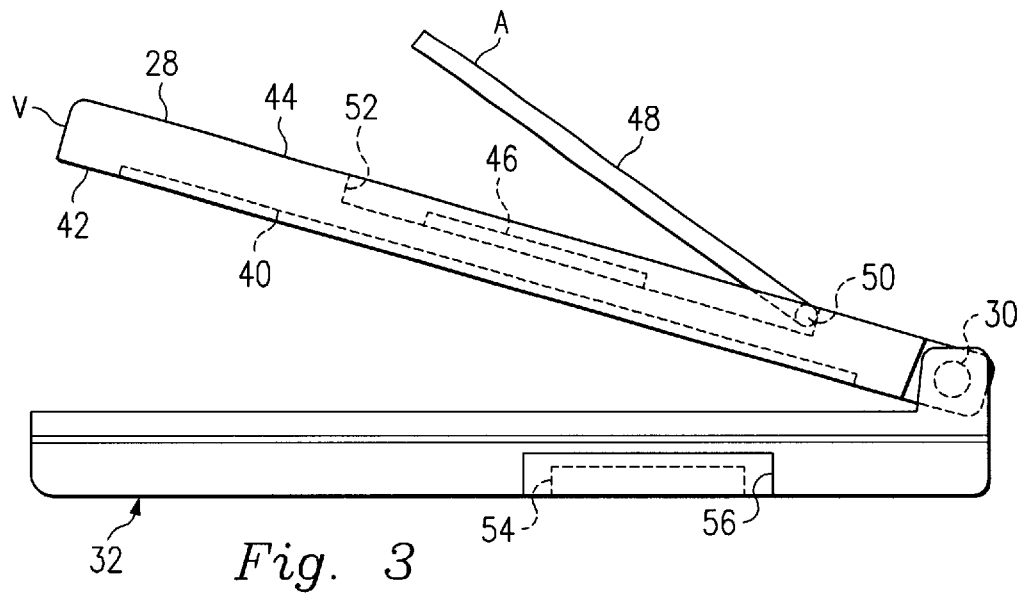
FIG. 3 is a side view diagrammatically illustrating an embodiment of a portable laptop computer.

The lid 28, FIG. 3, includes a first side 42 and a second external side 44 opposite first side 42. Although any suitable display can be used, the monitor display 40, typically a liquid crystal display (LCD), is mounted on first side 42 and an optical drive 46 is mounted in the second side 44. In this manner, the optical drive 46 is accessible without moving lid 28 to the open position V, see FIGS. 3, 4 and 5.

Figure 6:
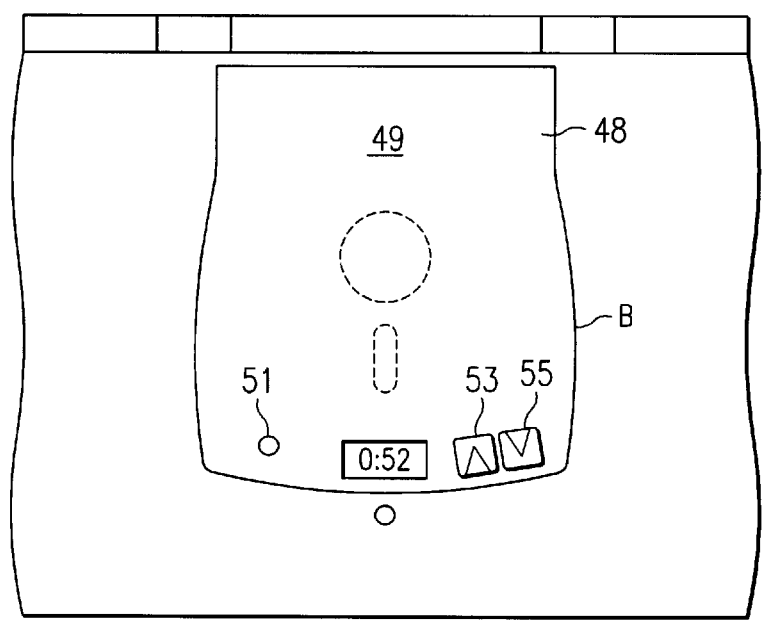
FIG. 6 is a top view illustrating an embodiment of a portable laptop computer.

Lid 28, includes an access door 48 pivotally attached to lid 28 at a pivot connection 50, for pivoting between an open position A and a closed position B, FIG. 6. A recess 52 formed in second side 44 and the optical drive 46 is mounted in recess 52. Another optical drive 54 is typically mounted in a bay 56 formed in base 32. Advantageously, the addition of the drive 46 to lid 28, does not demand space in base 32. The optical drives 46, 54 often include compact disc (CD), digital video disc (DVD), compact disc read write (CDRW) and DVD/CDRW drives.

Figure 4:
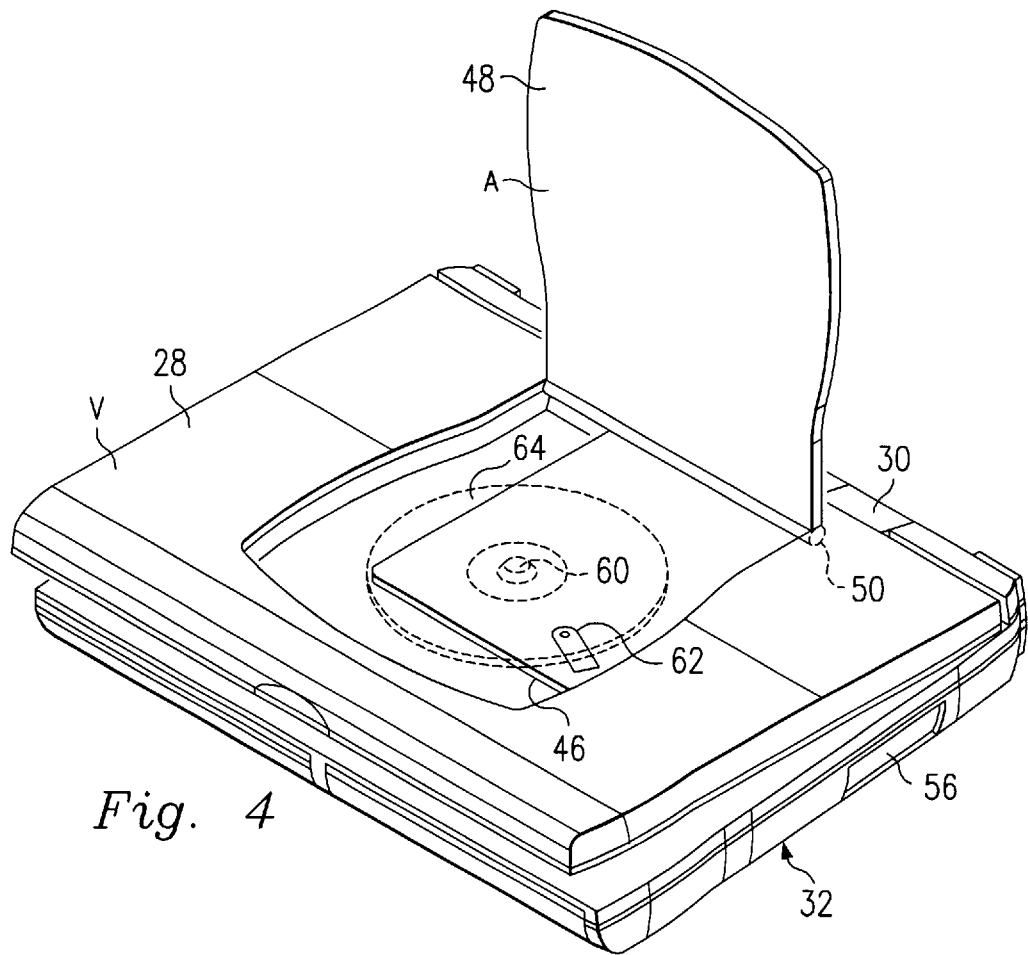
FIGS. 4 and 5 are perspective views illustrating an embodiment of a portable laptop computer.
Figure 5:
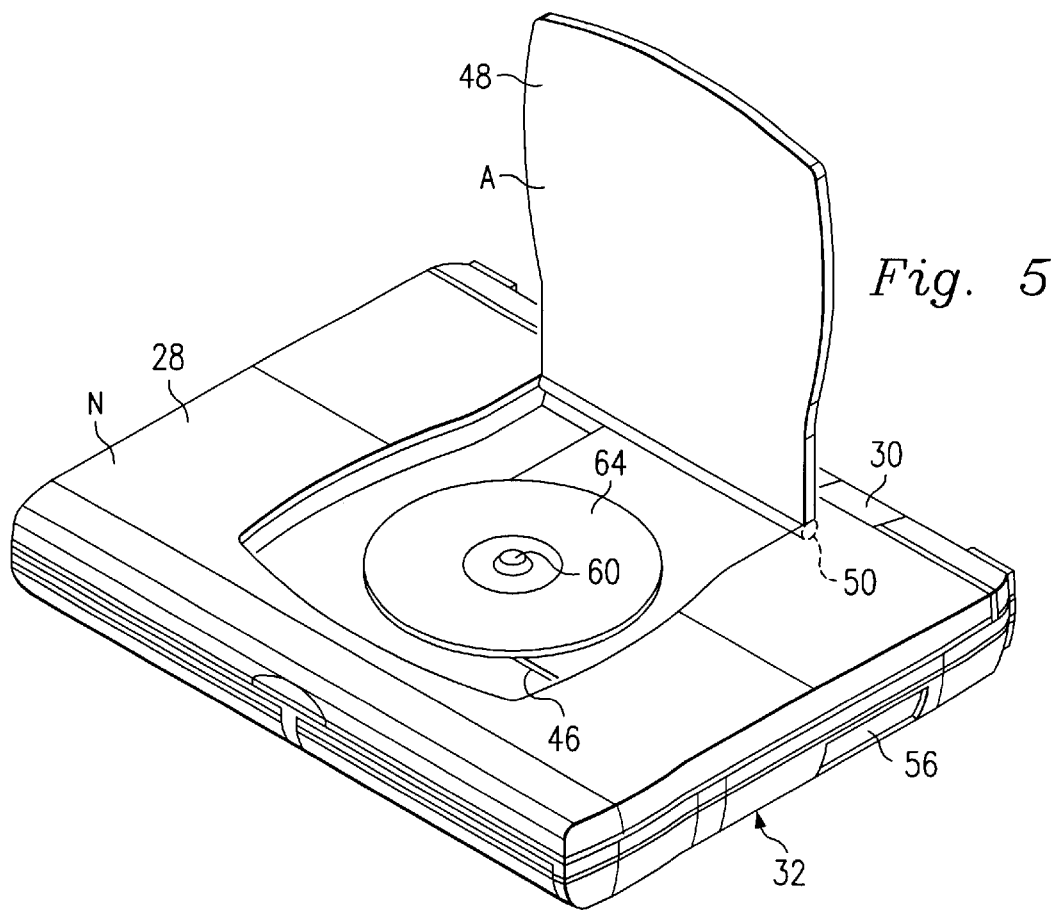

FIGS. 4 and 5 illustrate lid 28 in the open position V and closed position N, respectively. Also, access door 48 is shown in its open position A which reveals optical drive 46 including a spindle 60 an optical head 62, and a disc 64. The bay 56 is also shown in a sidewall of the base 32.

Figure 7:
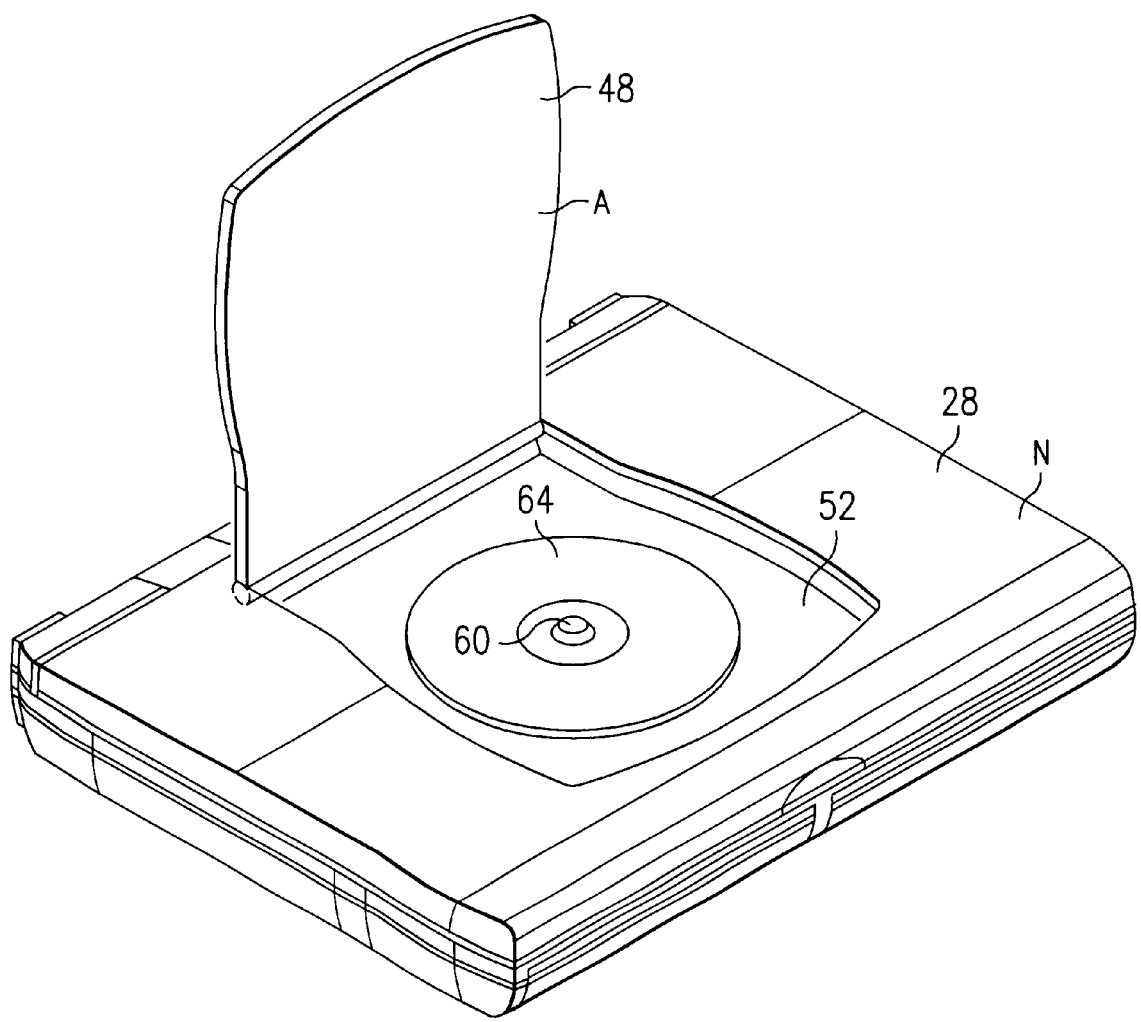
FIG. 7 is another perspective view illustrating an embodiment of a portable laptop computer.

In FIG. 6, access door 48 is in the closed position B and a surface 49 of access door 48 may include control function members such as a play control 51, a fast forward control 53 and a reverse control 55. This provides ready access to the control functions when access door 48 is closed. In FIG. 7, access door 48 is in the open position A and disc 64 is positioned on spindle 60 in recess 52. Lid 28 is in the closed position N.

As a result, one embodiment provides a portable computer comprising a base member, a lid member attached to the base member and movable between a closed position and an open position, a display mounted in the lid member, and an optical drive mounted in the lid member and positioned to be accessible without moving the lid member to the open position.

Another embodiment provides a portable computer system comprising a chassis having a base member and a lid member, a microprocessor mounted in the chassis, a storage coupled to the microprocessor, a video controller coupled to the microprocessor, a memory coupled to provide storage to facilitate execution of computer programs by the microprocessor, the lid member being attached to the base member and movable between a closed position and an open position, a display mounted in the lid member, and an optical drive mounted in the lid member and positioned to be accessible without moving the lid member to the open position.

A further embodiment provides a portable computer comprising a base member, a lid member attached to the base member and movable between a closed position and an open position, a display mounted on a first side of the lid member positioned adjacent the base member when the lid member is in the closed position, and an optical drive mounted on a second side of the lid member opposite the first side.

As can be seen, the principal advantages of these embodiments are that the optical drives are provided in the portable computer base and lid. The added optical drive in the lid is easy to access, provides a weight reduction and has minimal space requirements. Also, the optical drive mounted in the lid supplements the optical drive in the base without requiring a conventional additional drive mounted in the base.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A portable computer comprising:

a base member;

a single lid member attached to the base member and movable between a closed position and an open position;

a display mounted in an internal surface of the lid member; and an optical drive mounted in a recess formed in an external surface of the lid member opposite the internal surface and positioned to be accessible without moving the lid member to the open position.

2. The portable computer as defined in claim 1 wherein the display is positioned adjacent the base member when the lid member is in the closed position and the optical drive is mounted in the external surface of the lid member.

3. The portable computer as defined in claim 2 further comprising:

an access door mounted on the external surface of the lid member and movable for covering the recess.

4. The portable computer as defined in claim 3 further comprising:

control function members mounted on the lid member for controlling functions of the optical drive.

5. The portable computer as defined in claim 3 wherein the lid member is pivotally attached to the base member and the access door is pivotally mounted on the lid member.

6. The portable computer as defined in claim 3 further comprising:

another optical drive mounted in the base member.

7. A portable computer system comprising:

a chassis having a base member and a single lid member;

a microprocessor mounted in the chassis;

a storage coupled to the microprocessor;

a video controller coupled to the microprocessor;

a memory coupled to the microprocessor;

the lid member being attached to the base member and movable between a closed position and an open position;

a display mounted in a recess formed in an internal surface of the lid member; and an optical drive mounted in an external surface of the lid member opposite the internal surface and positioned to be accessible without moving the lid member to the open position.

8. The portable computer as defined in claim 7 further comprising:

an access door mounted on the external surface of the lid member and movable for covering the recess.

9. The portable computer as defined in claim 8 further comprising:

control function members mounted on the lid member for controlling functions of the optical drive.

10. The portable computer as defined in claim 7 further comprising:

a compact disc access door mounted on the external surface of the lid member adjacent the optical drive and movable between an open position and a closed position.

11. A portable computer comprising:

a base member;

a single lid member attached to the base member and movable between a closed position and an open position;

a display mounted in an internal surface of the lid member positioned adjacent the base member when the lid member is in the closed position; and an optical drive mounted in a recess formed in an external surface of the lid member opposite the internal surface.

12. The portable computer as defined in claim 11 wherein the optical drive is accessible without moving the lid member to the open position.

13. The portable computer as defined in claim 11 wherein the lid member is pivotally attached to the base member and an optical drive access door is pivotally mounted on the lid member.

14. The portable computer as defined in claim 11 further comprising:

another drive mounted in the base member.

15. A method of providing access to a drive in a portable computer comprising:

providing a base member;

attaching a single lid member to the base member, the lid member being movable between a closed position and an open position;

mounting a display on an internal surface of the lid member;

providing a recess in an external surface of the lid member, opposite the internal surface;

mounting an optical drive in the recess; and covering the recess with a movable access door.

* * * * *